(No Model.)
L. H. WARD.
Apparatus for Obtaining a Vacuum.
No. 230,512. Patented July 27, 1880.
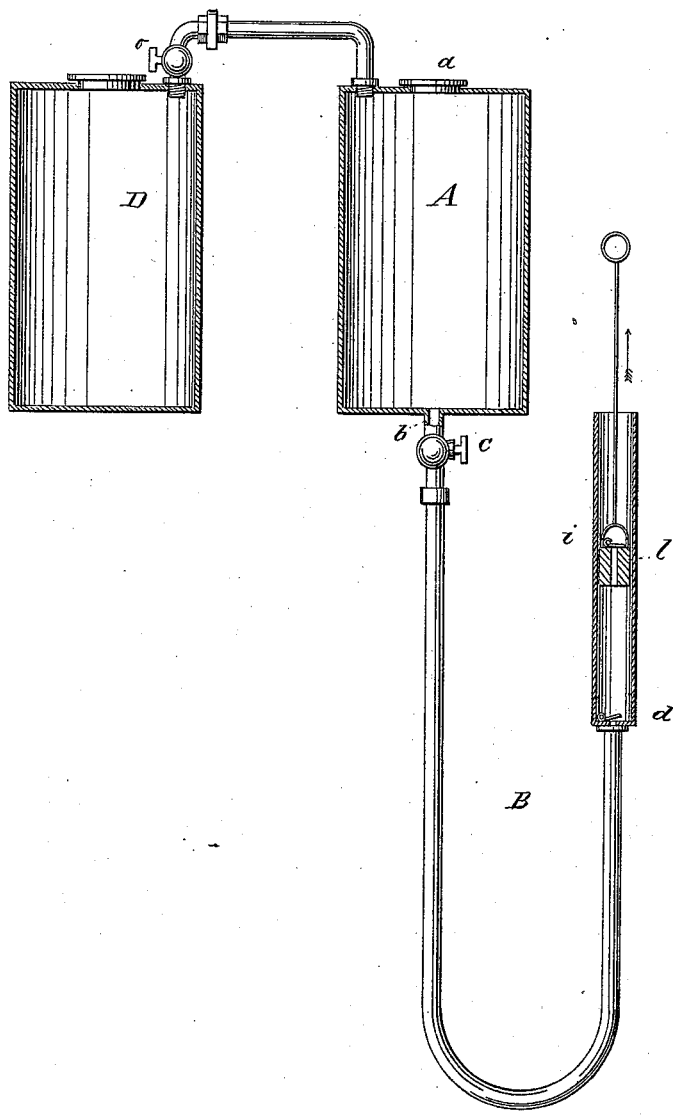
WITNESSES:
Chas. Nida.
C. Sedgwick
INVENTOR:
L. H. Ward
BY Munn & Co.
ATTORNEYS.

UNITED STATES PATENT OFFICE.

LYMAN H. WARD, OF ST. MARY'S, TEXAS.

APPARATUS FOR OBTAINING A VACUUM.

SPECIFICATION forming part of Letters Patent No. 230,512, dated July 27, 1880.

Application filed May 7, 1880. (No model.)

*To all whom it may concern:*

Be it known that I, LYMAN H. WARD, of St. Mary's, in the county of Refugio and State of Texas, have invented a new and useful Improvement in Means for Obtaining a Vacuum, of which the following is a specification.

The object of my invention is to furnish a simple and efficient apparatus for obtaining a vacuum, the said apparatus being illustrated in the annexed drawing.

A is a vessel in which a vacuum is to be produced. $a$ is an opening at the top of the vessel A, fitted with a plate, which may be secured to close the opening air-tight when required. $b$ is a short tube fitted in the bottom of vessel A, and provided with a cock, $c$, for closing tube $b$ air-tight. B is a siphon-shaped tube coupled to pipe $b$ by one leg, the other leg, $i$, extending above the bottom of the vessel A and having an open end. $d$ is the valve fitted in the lower part of the longer leg $i$ of the siphon. $e$ is a pump-rod in the leg $i$ of the siphon-tube, carrying a valved piston-head.

To obtain a vacuum in the vessel A cock $c$ is to be opened, and the vessel A and tube B are to be filled with water or other liquid by pouring the same in at the opening $a$. The cap is then to be screwed down over the opening $a$ and the pump operated. The water will by its weight flow up into the leg $i$, and the valve $d$ will prevent its return as the plunger is moved down. As soon as the water flows below the cock $c$ said cock is to be closed, and the exhausted vessel A may then be uncoupled.

It will be seen that the pump acts by dead lift, and the pressure of atmosphere being removed the water is caused to rise above the valve by the weight of the superior column.

Various modifications of this apparatus may be constructed to operate on this principle and used for many useful purposes.

I have shown at D a vessel in which substances are to be placed for preservation in vacuum.

$f$ is a short tube entering through the top of vessel D, provided with a cock, $o$, to close the tube air-tight, and coupled at its outer end to a pipe passing to the exhaust-vessel A. Vacuum having been obtained in the vessel A, as described, and the substance to be preserved placed in D, the cock $o$ is to be opened, and the air in D will pass to A until the pressure is equalized. This will give about as perfect a vacuum in vessel D as can be obtained by an ordinary air-pump, and if a better vacuum is required the operation is to be repeated by exhausting vessel A again, as first required.

Having thus fully described my invention, I claim as new and desire to secure by Letters Patent—

The vessel A, having top aperture, $a$, with closing-plate, and the bottom tube, $b$, having cock $c$, in combination with the two-legged pipe B, the longer leg being provided with a valve, $d$, and a rod, $e$, carrying a valved piston-head, as and for the purpose specified.

LYMAN HENRY WARD.

Witnesses:
J. C. GRAY,
JOHN W. WARD.